United States Patent
C et al.

(10) Patent No.: US 10,616,249 B2
(45) Date of Patent: Apr. 7, 2020

(54) ADAPTIVE INTERNET OF THINGS EDGE DEVICE SECURITY

(71) Applicant: Intel Corporation, Santa Clara, CA (US)

(72) Inventors: Subramanian C, Banagalore (IN); Balachandar Santhanam, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 841 days.

(21) Appl. No.: 15/087,779

(22) Filed: Mar. 31, 2016

(65) Prior Publication Data

US 2017/0289184 A1  Oct. 5, 2017

(51) Int. Cl.
*H04L 29/06* (2006.01)
*H04L 29/08* (2006.01)

(52) U.S. Cl.
CPC ...... *H04L 63/1425* (2013.01); *H04L 63/0227* (2013.01); *H04L 67/12* (2013.01); *Y04S 40/18* (2018.05)

(58) Field of Classification Search
CPC ............ G06F 21/55–554; G06F 21/56; G06F 21/564; G06F 21/566; G06F 21/567; H04L 63/14–1425; H04L 63/1441–145
See application file for complete search history.

(56) References Cited

U.S. PATENT DOCUMENTS

| | | | |
|---|---|---|---|
| 2008/0263677 A1* | 10/2008 | Kaditz | G06F 21/55 726/29 |
| 2009/0019531 A1 | 1/2009 | Rosenberger | |
| 2009/0193119 A1* | 7/2009 | Saxena | H04L 43/067 709/224 |
| 2012/0047551 A1 | 2/2012 | Pattar et al. | |
| 2014/0229588 A1 | 8/2014 | Hjelm et al. | |
| 2014/0245374 A1* | 8/2014 | Deerman | H04L 63/20 726/1 |
| 2015/0019714 A1 | 1/2015 | Shaashua et al. | |
| 2015/0156266 A1 | 6/2015 | Gupta | |
| 2016/0173516 A1* | 6/2016 | Raugas | H04L 63/1408 726/23 |

OTHER PUBLICATIONS

International Search Report and Written Opinion in International Application No. PCT/US2017/020195, dated Jun. 7, 2017, 10 pages.

* cited by examiner

*Primary Examiner* — Kevin Bechtel
(74) *Attorney, Agent, or Firm* — Alliance IP, LLC

(57) ABSTRACT

In an example, there is disclosed an apparatus, including: a network interface to communicatively couple to an internet of thing (IoT) having at least one edge device; a gateway engine to provide gateway services to one or more edge devices via the network interface; and one or more logic devices, including at least one hardware logic device, providing an adaptive security engine to: compile a periodic device interaction summary (DIS) for the edge device; send the DIS to a cloud service; receive from the cloud service a DIS signature for the edge device; determine that one or more interactions from the edge device are suspicious; and act on the determining.

25 Claims, 8 Drawing Sheets

ADAPTIVE INTERNET OF THINGS EDGE DEVICE SECURITY

FIELD OF THE SPECIFICATION

This disclosure relates in general to the field of internet of thing (IoT) security, and more particularly, though not exclusively to, a system and method for adaptive IoT edge device security.

BACKGROUND

The Internet of Things (IoT) is a loosely-defined network of physical objects (things) with embedded computing and communication capabilities, thus allowing the "things" to exchange data with one another. Within the IoT, real world phenomena can be sensed or observed electronically, and outputs from sensors or other data sources may be used as an input to a control system. In some cases, this allows a tighter coupling between the physical world and the virtual space. Each "thing" in the IoT may be uniquely identified with its physical computing platform, and some things are configured to operate within the existing internet infrastructure. Other devices operate over other network topologies, including ad hoc networks and direct data connections among others. In general terms, the IoT is considered to be a highly-democratic (sometimes even anarchic) in which individual devices and networks may have broad autonomy in terms of what they do, how they do it, and how they communicate about it.

BRIEF DESCRIPTION OF THE DRAWINGS

The present disclosure is best understood from the following detailed description when read with the accompanying figures. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

SUMMARY

Figure 1:
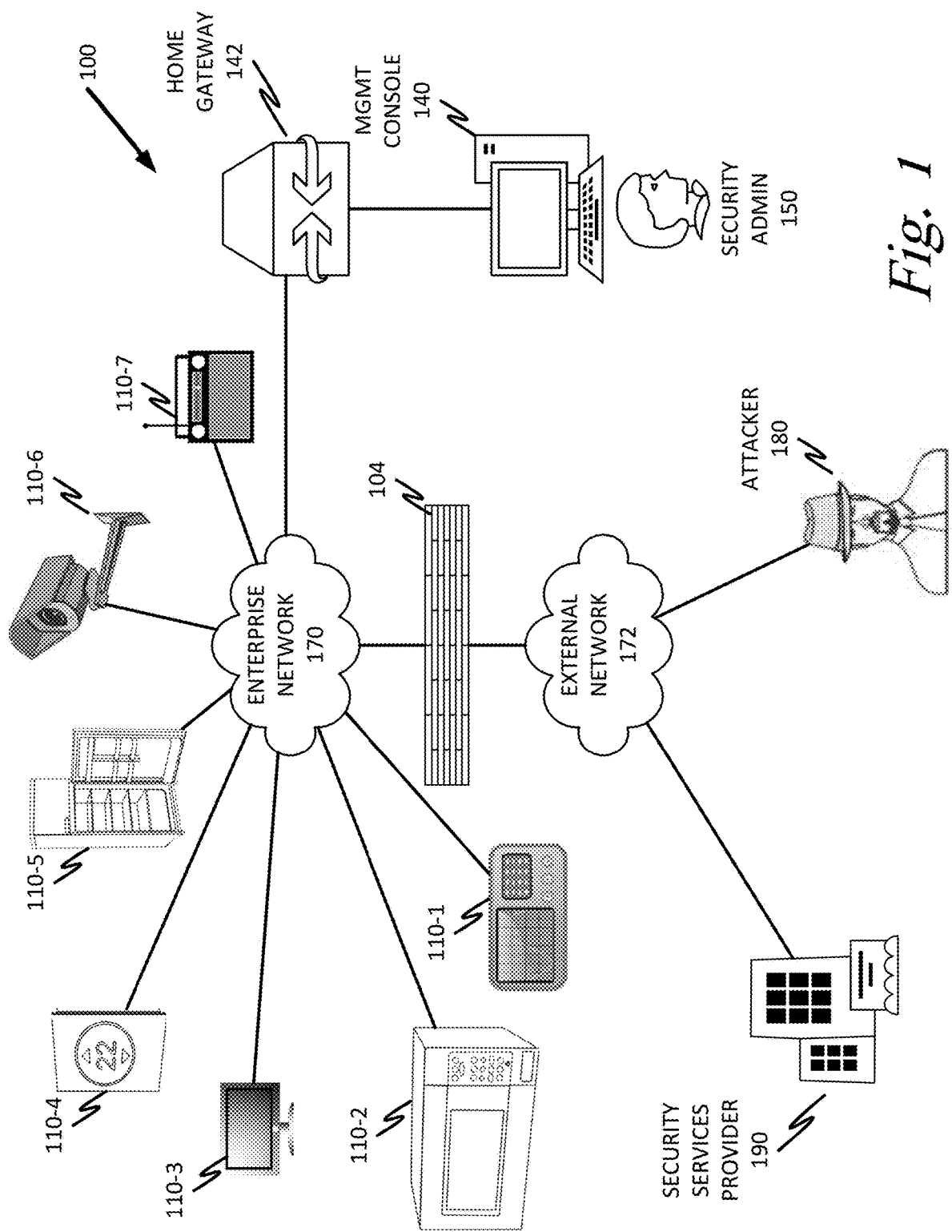
FIG. 1 is a block diagram of a home network, which may be or comprise an IoT realm or domain, according to one or more examples of the present specification.

In an example, there is disclosed an apparatus, including: a network interface to communicatively couple to an internet of thing (IoT) having at least one edge device; a gateway engine to provide gateway services to one or more edge devices via the network interface; and one or more logic devices, including at least one hardware logic device, providing an adaptive security engine to: compile a periodic device interaction summary (DIS) for the edge device; send the DIS to a cloud service; receive from the cloud service a DIS signature for the edge device; determine that one or more interactions from the edge device are suspicious; and act on the determining.

Embodiments of the Disclosure

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

The "Internet of Things" (IoT) is an explosive global aggregation of heterogeneous "smart" and "network-enabled" devices that often each provide a single, specialized function. The IoT includes smart appliances, smart sensors, smart phones, and a plethora of other devices to which "smart" can be (and often is) prepended.

Because the IoT is not a traditional network, it presents challenges that are sometimes new and unique. For example, in traditional networking, an oligarchy of naming authorities parcel out a relative handful of globally-unique internet protocol (IP) addresses, as in the IPv4 space, which has a theoretical maximum of approximately 4.3 billion unique addresses. This made global IPv4 addresses a relatively dear commodity to be managed centrally by an administrative body. But the cascade of IoT devices makes such a scheme both impractical and undesirable for many. Rather, IoT devices may operate within defined subnetworks using network address translation (NAT), or may self-declare a "Universally Unique Identifier" (UUID), which in one example is a 128-bit integer, and which may be usable as an IPv6 IP address. Such autonomous naming presents both new opportunities and new challenges that users and enterprises are still working to understand and appreciate. In one sense, the IoT may be viewed as a new, wild frontier, where rules are still evolving and where any device can be practically anything that it wants to be. While this provides exciting opportunities for innovators to experiment and try new things, it also provides a sometimes-lawless frontier where devices and their designers may not always be able to rely on traditional security solutions.

The IoT in general, and "smart" homes and businesses in particular, have seen a recent explosion of different devices connecting over personal area networks (PAN), including wireless PANs (WPAN). A PAN is a species of network for communicating among local or personal devices, such as computers, telephones, smart phones, tablets, and personal digital assistants (PDAs). PANs can facilitate communication among the devices themselves, or can provide an uplink to a higher level network such as the internet. PANs may use various communication standards, such as INSTEON, IrDA, wireless USB, Bluetooth, Z-wave, ZigBee, body area network (BAN), Bluetooth Low Energy (BTLE), and others.

The proliferation of PANs, and many competing communication standards, has paved the way for new security risks. For example, many PANs have a gateway device that manages communication among devices, and that provides an uplink to the higher level network. An attacker may spoof the gateway (or a cloud service that provides management functions to the gateway), by imitating an authorized device on the PAN. The attacker may use this to either attack the PAN and attempted to gain access to privileged functions, or in a more rough attack, may simply initiate a denial of service (DoS) attack. This may render the home or business unresponsive to automation and control for long periods of time.

As the IoT systems move more towards autonomous execution of tasks, this becomes more important as an attacker can cause damage without bypassing any of the gateway security and by simply taking over a simple but unsecure device. The challenge may be exacerbated considering that most PAN technologies are not Internet Protocol (IP) based. This may result in undesirable events ranging from security breaches that could result in a compromise of sensitive data, to annoyances, like a gateway becoming unresponsive while a user is locked out of his home waiting for a security server to recognize his face.

Embodiments of the present specification use machine learning to characterize a device's communications. Using a home gateway as an example, as devices interact with the gateway throughout the day, the gateway logs each interaction. On a periodic schedule, such as at the end of each day, the home gateway uploads a device interaction summary (DIS) for each device to a cloud service. The cloud service may convert the DIS from a time-domain summary to a frequency-domain signature characteristic of the device. The cloud service then provides the DIS signature to the home gateway via a push notification. The home gateway is then equipped to compare interactions to the DIS signature, and to take appropriate remedial action in the case of a mismatch, such as blacklisting the device (either temporarily, or until the error has been corrected), querying a security administrator for a remedial action, or consulting the cloud service for a remedial action.

Embodiments of the specification address these issues by using machine learning techniques to learn about valid or normal device interaction behaviors, and to provide early detection of rogue devices or anomalous behavior, thus allowing the system or a human user to take remedial action. In an example, an anomaly detection engine observes interaction patterns of various local IoT edge devices, and uses machine learning at the cloud to generate a normal interaction "fingerprint" or "signature." The local gateway can then use this fingerprint to detect anomalies and take remedial actions.

Example scenarios where the teachings of this specification may be used include the following.

Inference Based on Anomaly:

Devices like smoke detectors or water level sensors may be battery operated, and may send data to the gateway on a consistent, fixed period. These devices are classified as "fixed periodic" data generators. Since these devices are battery operated, the battery needs to be replaced periodically. This replacement cycle may typically be based on a fixed time period. An anomaly detection engine as described herein may examine the interaction pattern, and alert the user that it is time to change the battery with reasonable accuracy, based on interruptions in the pattern.

Changed Pattern:

Edge devices such as door sensors send data only when an event happens (e.g., somebody opened the door). These devices are classified as "random" data generators. However, even a "random" data generator will have some characteristic behaviors. For example, in a home network, the door may be used infrequently during the day, and then more frequently when the kids come home from school, as they come and go with friends. This behavior may also be seasonal. From September to May, door usage may be minimal during the day, while from June to August, daytime door usage may increase. If a random device suddenly starts sending a continuous or near-continuous data stream, this may indicate an issue (such as a DoS attack). Based on the mismatch with the profile, the home gateway may immediately generate an alert to the network administrator so that remedial action may be taken. Incoming notifications from the device may also be blacklisted until the issue is resolved, so that the runaway device does not flood the network.

Related Sensing Devices:

Some devices may be tagged as operating in tandem. For example, if device A does not generate any interaction, then device B is also expected not to generate any interaction. This knowledge may be used to generate useful alerts when any deviation occurs. For example, when the motion detectors detect no motion, motion-activated smart lights should not be generating notifications.

Embodiments of the present specification include a "home gateway" device (adaptive security agent), and a cloud service (adaptive security service). The labels "home gateway" and "cloud service" should not be misconstrued to limit embodiments of the present disclosure. A "home gateway" may just as easily be applied to a business or other enterprise, and should be understood to encompass any gateway device that provides gateway services to a collection of one or more IoT edge devices. Similarly, a "cloud service" need not be limited to an offsite, third-party service. Rather, an enterprise could provide its own internal cloud service, or cloud services could be provided on the same device as the home gateway. Thus, the terms "home gateway" and "cloud service" should be understood to be descriptive and illustrative labels used herein to facilitate discussion and understanding, and should not be understood to limit the disclosed embodiments.

As new devices are added to the local IoT, a gateway agent provisions each device within the anomaly detection service. Provisioning a device may include collecting, for example, metadata, device ID, media access control (MAC) address, device type, and connection protocol, by way of nonlimiting example. The gateway agent begins logging interactions for each new edge device added, and at the end of the day, creates a device interaction summary (DIS). In one embodiment, the home gateway stored DIS as a daily time-series array. A "day" should be understood to be a nonlimiting example of a period that may be used as a collection benchmark herein. Any other period suitable for the particular embodiment may be used. At the end of each day, the DIS is uploaded to the cloud service for processing.

In its turn, the gateway agent receives from the cloud service, such as over a secure link employing push notifications, a DIS signature for each device. The home gateway stores the DIS signature in a secure location within its storage. The gateway agent may then use the DIS signature to identify suspicious or inconsistent activity, according to the methods disclosed herein, such as the methods 500 and 600 of FIGS. 5 and 6 below. The cloud service, in its turn, may employ method 700 of FIG. 7 below. These methods should be understood to be nonlimiting and illustrative examples of methods that may be employed by the present system. The methods disclosed have certain operations disclosed in a particular order, but the disclosed operations are intended to be nonexclusive. Any number of additional operations may be interposed between or in addition to those disclosed. Furthermore, the order of operations presented is not intended to be rigid or exclusive. Unless noted expressly, the operations disclosed may be rearranged into any logical order that words for a particular embodiment, and some operations may be repeated, excluded, or performed in parallel, in any suitable combination.

It should also be noted that while a certain "division of labor" is disclosed herein, those divisions are intended to be functional divisions rather than to imply any necessary physical division of devices. For example, in some embodiments, the functions of a cloud service may be integrated with the functions of a home gateway in a single physical device, so that when one device "sends" data to the other device, or "receives" data from the other device, this may encompass transferring data between different functional blocks, procedures, or objects on a single physical device.

A system and method for adaptive IoT edge device security will now be described with more particular reference to the attached FIGURES. It should be noted that throughout the FIGURES, certain reference numerals may be repeated to indicate that a particular device or block is wholly or substantially consistent across the FIGURES. This is not, however, intended to imply any particular relationship between the various embodiments disclosed. In certain examples, a genus of elements may be referred to by a particular reference numeral ("widget 10"), while individual species or examples of the genus may be referred to by a hyphenated numeral ("first specific widget 10-1" and "second specific widget 10-2").

FIG. 1 is a network level diagram of a home network 100 according to one or more examples of the present Specification. Home network 100 illustrates an example application in which the IoT provides inputs from a plurality of home automation devices, which are managed by a security gateway. As discussed above, the term "home network" is intended to encompass any type of enterprise network with managed IoT devices. Thus, the term "home" should be construed to refer to a centralized location where management occurs, and not to be limited to a single-family dwelling.

In this example, home network 100 includes a plurality of edge devices 110, an enterprise network 170, a secured gateway 142 managed by a management console 140, and a security administrator 150. Enterprise network 104 is "walled off" by an enterprise boundary 104, and connects to an external network 172. A security services provider 190 may also operate on external network 172, as well as an attacker 180 who attempts to gain unauthorized access to enterprise network 170 or to otherwise disrupt operations of enterprise network 170.

Edge devices 110 are (broadly speaking) the "internet of things." In this case, by way of illustrative and nonlimiting example, a smart meter 110-1, a smart microwave 110-2, a smart TV 110-3, a smart thermostat 110-4, a smart fridge 110-5, a smart security camera 110-6, and a smart radio 110-7 are illustrated. Many other "smart" (i.e., capable of communicating over a network interface) devices may be provided. The devices shown here are focused largely on home automation, but there are many other IoT possibilities. In a municipal IoT, edge devices 110 may include traffic lights, traffic cameras, power grid sensors, water level sensors, waste management systems, and municipal vehicles. In a business enterprise, edge devices 110 may include PCs, workstations, and printers. On a smaller scale, edge devices 110 may be nanobots or distributed sensors that each communicate with gateway 142. Any of these examples may be an embodiment of home network 100. Many other embodiments are available, and are intended to be covered by the broad scope of this specification.

Broadly speaking, edge device 110 is any device that connects downstream from home gateway 142. Edge devices 110 may serve as data sources, periodically reporting data to home gateway 142, and thus allowing home gateway 142 to coordinate actions within home network 100. For example, if home network 100 includes a home automation system, data from edge devices 110 may be used to lock, unlock, and open doors, turn devices on and off, order supplies and groceries, manage air conditioning, and provide home security, to name just a few nonlimiting examples.

Edge devices 110 may be communicatively coupled to one another and to other network resources via enterprise network 170. Enterprise network 170 may be any suitable network or combination of one or more networks operating on one or more suitable networking protocols, including for example, a local area network, an intranet, a virtual network, a wide area network, a wireless network, a cellular network, or the Internet (optionally accessed via a proxy, virtual machine, or other similar security mechanism) by way of nonlimiting example. Enterprise network 170 may also include one or more servers, firewalls, routers, switches, security appliances, antivirus servers, or other useful network devices, which in an example may be virtualized within workload cluster 142. In this illustration, enterprise network 170 is shown as a single network for simplicity, but in some embodiments, enterprise network 170 may include a large number of networks, such as one or more enterprise intranets connected to the internet. Enterprise network 170 may also provide access to an external network, such as the Internet, via external network 172. External network 172 may similarly be any suitable type of network.

A home gateway 142 provides gateway services to edge devices. Gateway services may include, by way of nonlimiting example, protocol translation, impedance matching, rate conversion, fault isolation, signal conversion, and administration, and administrative procedures. Security gateway 142 also provides adaptive security to edge devices according to the methods disclosed herein.

One or more computing devices configured as a management console 140 may also operate on enterprise network 170. Management console 140 may provide a user interface for a security administrator 150 to define enterprise security policies, which management console 140 may enforce on enterprise network 170 and across edge devices 110 and home gateway 142. In an example, management console 140 may run a server-class operating system, such as Linux, Unix, or Windows Server. In other case, management console 140 may be provided as a web interface, on a desktop-class machine, or via a VM provisioned within workload cluster 142.

Home network 100 may encounter a variety of "security objects" on the network. A security object may be any object that operates on or interacts with enterprise network 170 and that has actual or potential security implications. In one example, security objects may be broadly divided into hardware objects, including any physical device that communicates with or operates via the network, and software objects. Software objects may be further subdivided as "executable objects" and "static objects." Executable objects include any object that can actively execute code or operate autonomously, such as applications, drivers, programs, executables, libraries, processes, runtimes, scripts, macros, binaries, interpreters, interpreted language files, configuration files with inline code, embedded code, and firmware instructions by way of non-limiting example. A static object may be broadly designated as any object that is not an executable object or that cannot execute, such as documents, pictures, music files, text files, configuration files without inline code, videos, and drawings by way of non-limiting example. In some cases, hybrid software objects may also be provided, such as for example a word processing document with built-in macros or an animation with inline code. For security purposes, these may be considered as a separate class of software object, or may simply be treated as executable objects.

Home network 100 may communicate across enterprise boundary 104 with external network 172. Enterprise boundary 104 may represent a physical, logical, or other boundary. External network 172 may include, for example, websites, servers, network protocols, and other network-based services. In one example, a security services provider 190 may be accessible via external network 172, while an attacker 180 may try to gain unauthorized access to home network 100.

It is desirable for home network 100 to operate without interference from attacker 180 or from unwanted security objects. In one example, attacker 180 is a malware author, whose goal or purpose is to cause malicious harm or mischief, for example by injecting malicious objects into edge devices 110. Once a malicious object gains access to an edge device 110, it may try to perform work such as social engineering of users, corruption of data provided by edge devices 110, a hardware-based attack on edge devices 110, modifying storage, modifying client applications, gaining access to private files or data, or denial of service on home network 100.

The malicious harm or mischief may take the form of installing root kits or other malware on edge devices 110 to tamper with the system, installing spyware or adware to collect personal and commercial data, defacing websites, operating a botnet such as a spam server, or simply to annoy and harass users of home network 100. Thus, one aim of attacker 180 may be to install his malware on one or more edge devices 110. As used throughout this specification, malicious software ("malware") includes any security object configured to provide unwanted results or do unwanted work. In many cases, malware objects will be executable objects, including by way of non-limiting examples, viruses, Trojans, zombies, rootkits, backdoors, worms, spyware, adware, ransomware, dialers, payloads, malicious browser helper objects, tracking cookies, loggers, or similar objects designed to take a potentially-unwanted action, including by way of non-limiting example data destruction, covert data collection, browser hijacking, network proxy or redirection, covert tracking, data logging, keylogging, excessive or deliberate barriers to removal, contact harvesting, and unauthorized self-propagation.

Attacker 180 may also want to commit industrial or other espionage against home network 100, such as stealing classified or proprietary data, stealing identities, or gaining unauthorized access to enterprise resources. Thus, attacker 180's strategy may also include trying to gain physical access to one or more edge devices 110 and operating them without authorization, so that an effective security policy may also include provisions for preventing such access.

In another example, a software developer may not explicitly have malicious intent, but may develop software that poses a security risk. For example, a well-known and often-exploited security flaw is the so-called buffer overrun, in which a malicious user is able to enter an overlong string into an input form and thus gain the ability to execute arbitrary instructions or operate with elevated privileges on a computing device. Buffer overruns may be the result, for example, of poor input validation or use of insecure libraries, and in many cases arise in nonobvious contexts. Thus, although she is not necessarily malicious, a developer contributing software to an application repository may inadvertently provide attack vectors for attacker 180. Poorly-written applications may also cause inherent problems, such as crashes, data loss, denial of service, or other undesirable behavior. Because such software may be desirable itself, it may be beneficial for developers to occasionally provide updates or patches that repair vulnerabilities as they become known. However, from a security perspective, these updates and patches are essentially new objects that must themselves be validated.

In some cases, home network 100 may provide policy directives that restrict the types of applications that can be installed on edge devices 110. Thus, an application repository may include some software that is not negligently developed and is not malware, but that is nevertheless against policy. For example, some enterprises restrict installation of entertainment software like media players and games. Thus, even a secure media player or game may be unsuitable for an enterprise computer. Security administrator 150 may be responsible for distributing a computing policy consistent with such restrictions and enforcing it on edge devices 110. Some such software may cause uncharacteristic notification patterns that may be detected by an adaptive security engine of home gateway 142.

Home network 100 may also contract with or subscribe to a security services provider 190, which may provide security services, updates, antivirus definitions, patches, products, and services. Intel® corporation is a non-limiting example of such a security services provider that offers comprehensive security and antivirus solutions. In some cases, security services provider 190 may provide a cloud service designed specifically to interact with home gateway 142. The cloud service may communicate with home gateway 142 over a secure link, and objects passed between them may be cryptographically verified. For example, home gateway 142 may provide a trusted execution environment (TEE), and security services provider 190 may provide a TEE with corresponding functionality. Non-limiting examples of solutions that either are or that can provide a TEE include Intel® SGX, ARM TrustZone, AMD Platform Security Processor, Kinibi, securiTEE, OP-TEE, TLK, T6, Open TEE, Sierra-TEE, CSE, VT-x, MemCore, Canary Island, Docker, and Smack.

In another example, home network 100 may simply be a family, with parents assuming the role of security administrator 150. The parents may wish to protect their children from undesirable content, such as pornography, adware, spyware, age-inappropriate content, advocacy for certain political, religious, or social movements, or forums for discussing illegal or dangerous activities, by way of non-limiting example. In this case, the parent may perform some or all of the duties of security administrator 150.

In certain examples, home network 100 (or suitable portions thereof) may form an IoT "realm" or "domain," or may be part of a larger realm or domain.

Figure 2:
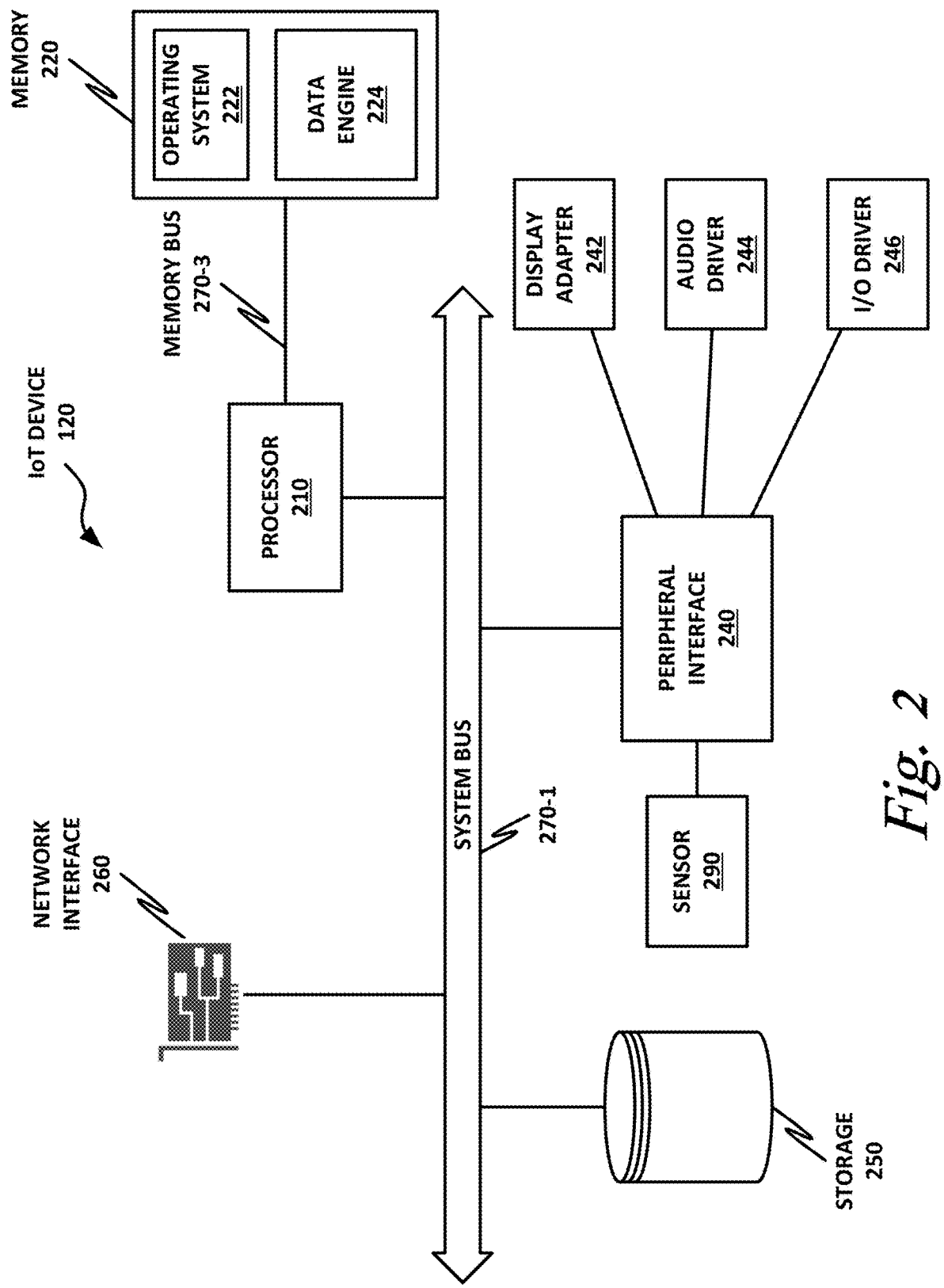
FIG. 2 is a block diagram of an edge device according to one or more examples of the present specification.

FIG. 2 is a block diagram of an edge device 110 according to one or more examples of the present specification. Edge device 110 may be any suitable computing device. In various embodiments, a "computing device" may be or comprise, by way of non-limiting example, a computer, workstation, server, mainframe, virtual machine (whether emulated or on a "bare-metal" hypervisor), embedded computer, embedded controller, embedded sensor, personal digital assistant, laptop computer, cellular telephone, IP telephone, smart phone, tablet computer, convertible tablet computer, computing appliance, network appliance, printer, receiver, wearable computer, handheld calculator, or any other electronic, microelectronic, or microelectromechanical device for processing and communicating data. Any computing device may be designated as a host on the network. Each computing device may refer to itself as a "local host," while any computing device external to it may be designated as a "remote host."

Edge device 110 includes a processor 210 connected to a memory 220, having stored therein executable instructions for providing an operating system 222 and at least software portions of a data collection engine 224. Other components of edge device 110 include a storage 250, network interface 260, and peripheral interface 240. This architecture is provided by way of example only, and is intended to be non-exclusive and non-limiting. Furthermore, the various parts disclosed are intended to be logical divisions only, and need not necessarily represent physically separate hardware and/or software components. Certain computing devices provide main memory 220 and storage 250, for example, in a single physical memory device, and in other cases, memory 220 and/or storage 250 are functionally distributed across many physical devices. In the case of virtual machines or hypervisors, all or part of a function may be provided in the form of software or firmware running over a virtualization layer to provide the disclosed logical function. In other examples, a device such as a network interface 260 may provide only the minimum hardware interfaces necessary to perform its logical operation, and may rely on a software driver to provide additional necessary logic. Thus, each logical block disclosed herein is broadly intended to include one or more logic elements configured and operable for providing the disclosed logical operation of that block. As used throughout this specification, "logic elements" may include hardware, external hardware (digital, analog, or mixed-signal), software, reciprocating software, services, drivers, interfaces, components, modules, algorithms, sensors, components, firmware, microcode, programmable logic, or objects that can coordinate to achieve a logical operation.

In an example, processor 210 is communicatively coupled to memory 220 via memory bus 270-3, which may be for example a direct memory access (DMA) bus by way of example, though other memory architectures are possible, including ones in which memory 220 communicates with processor 210 via system bus 270-1 or some other bus. Processor 210 may be communicatively coupled to other devices via a system bus 270-1. As used throughout this specification, a "bus" includes any wired or wireless interconnection line, network, connection, bundle, single bus, multiple buses, crossbar network, single-stage network, multistage network or other conduction medium operable to carry data, signals, or power between parts of a computing device, or between computing devices. It should be noted that these uses are disclosed by way of non-limiting example only, and that some embodiments may omit one or more of the foregoing buses, while others may employ additional or different buses.

In various examples, a "processor" may include any combination of logic elements operable to execute instructions, whether loaded from memory, or implemented directly in hardware, including by way of non-limiting example a microprocessor, digital signal processor, field-programmable gate array, graphics processing unit, programmable logic array, application-specific integrated circuit, or virtual machine processor. In certain architectures, a multi-core processor may be provided, in which case processor 210 may be treated as only one core of a multi-core processor, or may be treated as the entire multi-core processor, as appropriate. In some embodiments, one or more co-processor may also be provided for specialized or support functions.

Processor 210 may be connected to memory 220 in a DMA configuration via DMA bus 270-3. To simplify this disclosure, memory 220 is disclosed as a single logical block, but in a physical embodiment may include one or more blocks of any suitable volatile or non-volatile memory technology or technologies, including for example DDR RAM, SRAM, DRAM, cache, L1 or L2 memory, on-chip memory, registers, flash, ROM, optical media, virtual memory regions, magnetic or tape memory, or similar. In certain embodiments, memory 220 may comprise a relatively low-latency volatile main memory, while storage 250 may comprise a relatively higher-latency non-volatile memory. However, memory 220 and storage 250 need not be physically separate devices, and in some examples may represent simply a logical separation of function. It should also be noted that although DMA is disclosed by way of non-limiting example, DMA is not the only protocol consistent with this specification, and that other memory architectures are available.

Edge device 110 may include an appropriate operating system 222, such as Microsoft Windows, Linux, Android, Mac OSX, Apple iOS, Unix, or similar. Some of the foregoing may be more often used on one type of device than another. For example, desktop computers or engineering workstation may be more likely to use one of Microsoft Windows, Linux, Unix, or Mac OSX. Laptop computers, which are usually a portable off-the-shelf device with fewer customization options, may be more likely to run Microsoft Windows or Mac OSX. Mobile devices may be more likely to run Android or iOS. Embedded devices and dedicated appliances may run real-time operating systems such as real-time Linux, QNX, VxWorks, or FreeRTOS. For embedded devices without real-time demands, minimal Linux-based operating systems are currently very popular. However, all of the foregoing examples are intended to be nonlimiting.

Storage 250 may be any species of memory 220, or may be a separate device. Storage 250 may include one or more non-transitory computer-readable mediums, including by way of non-limiting example, a hard drive, solid-state drive, external storage, redundant array of independent disks (RAID), network-attached storage, optical storage, tape drive, backup system, cloud storage, or any combination of the foregoing. Storage 250 may be, or may include therein, a database or databases or data stored in other configurations, and may include a stored copy of operational software such as operating system 222 and software portions of data collection engine 224. Many other configurations are also possible, and are intended to be encompassed within the broad scope of this specification.

Network interface 260 may be provided to communicatively couple edge device 110 to a wired or wireless network, such as enterprise network 170. A "network," as used throughout this specification, may include any communicative platform operable to exchange data or information within or between computing devices, including by way of non-limiting example, an ad-hoc local network, an internet architecture providing computing devices with the ability to electronically interact, a plain old telephone system (POTS), which computing devices could use to perform transactions in which they may be assisted by human operators or in which they may manually key data into a telephone or other suitable electronic equipment, any packet data network (PDN) offering a communications interface or exchange between any two nodes in a system, or any local area network (LAN), metropolitan area network (MAN), wide area network (WAN), PAN, wireless local area network (WLAN), virtual private network (VPN), intranet, direct parallel or serial connection, packet radio, or any other appropriate architecture or system that facilitates communications in a network or telephonic environment.

Data collection engine 224, in one example, is operable to carry out computer-implemented methods as described in this specification, such as collecting and periodically, randomly, seasonally, or on some other schedule transmitting data to home gateway 142, or receiving data from home gateway 142. Data collection engine 224 may include one or more tangible non-transitory computer-readable mediums having stored thereon executable instructions operable to instruct a processor to provide a data collection engine 224. As used throughout this specification, an "engine" includes any combination of one or more logic elements (including, as appropriate, at least one hardware logic element), of similar or dissimilar species, operable for and configured to perform one or more methods provided by the engine. Thus, data collection engine 224 may comprise one or more logic elements configured to provide methods as disclosed in this specification. In some cases, data collection engine 224 may include a special integrated circuit designed to carry out a method or a part thereof, and may also include software instructions operable to instruct a processor to perform the method. In some cases, data collection engine 224 may run as a "daemon" process. A "daemon" may include any program or series of executable instructions, whether implemented in hardware, software, firmware, or any combination thereof, that runs as a background process, a terminate-and-stay-resident program, a service, system extension, control panel, bootup procedure, BIOS subroutine, or any similar program that operates without direct user interaction. In certain embodiments, daemon processes may run with elevated privileges in a "driver space," or in ring 0, 1, or 2 in a protection ring architecture. It should also be noted that data collection engine 224 may also include other hardware and software, including configuration files, registry entries, and interactive or user-mode software by way of non-limiting example.

In one example, data collection engine 224 includes executable instructions stored on a non-transitory medium operable to perform a method according to this specification. At an appropriate time, such as upon booting edge device 110 or upon a command from operating system 222 or a user 110, processor 210 may retrieve a copy of the instructions from storage 250 and load it into memory 220. Processor 210 may then iteratively execute the instructions of data collection engine 224 to provide the desired method.

Peripheral interface 240 may be configured to interface with any auxiliary device that connects to edge device 110 but that is not necessarily a part of the core architecture of edge device 110. A peripheral may be operable to provide extended functionality to edge device 110, and may or may not be wholly dependent on edge device 110. In some cases, a peripheral may be a computing device in its own right. Peripherals may include input and output devices such as displays, terminals, printers, keyboards, mice, modems, data ports (e.g., serial, parallel, USB, Firewire, or similar), network controllers, optical media, external storage, sensors, transducers, actuators, controllers, data acquisition buses, cameras, microphones, speakers, or external storage by way of non-limiting example.

In one example, peripherals include display adapter 242, audio driver 244, and input/output (I/O) driver 246. Display adapter 242 may be configured to provide a human-readable visual output, such as a command-line interface (CLI) or graphical desktop such as Microsoft Windows, Apple OSX desktop, or a Unix/Linux X Window System-based desktop. Display adapter 242 may provide output in any suitable format, such as a coaxial output, composite video, component video, VGA, or digital outputs such as DVI or HDMI, by way of nonlimiting example. In some examples, display adapter 242 may include a hardware graphics card, which may have its own memory and its own graphics processing unit (GPU). Audio driver 244 may provide an interface for audible sounds, and may include in some examples a hardware sound card. Sound output may be provided in analog (such as a 3.5 mm stereo jack), component ("RCA") stereo, or in a digital audio format such as S/PDIF, AES3, AES47, HDMI, USB, Bluetooth or Wi-Fi audio, by way of non-limiting example.

In an example, peripherals include one or more sensors 290, which may be configured and operable to collect data about real-world phenomena and to process the data into a digital form. In one operative example, data collection engine 224 collects data from sensor 290 via peripheral interface 240. The collected data may then be stored in storage 250 and/or sent over network interface 260 to home gateway 142.

Figure 3:
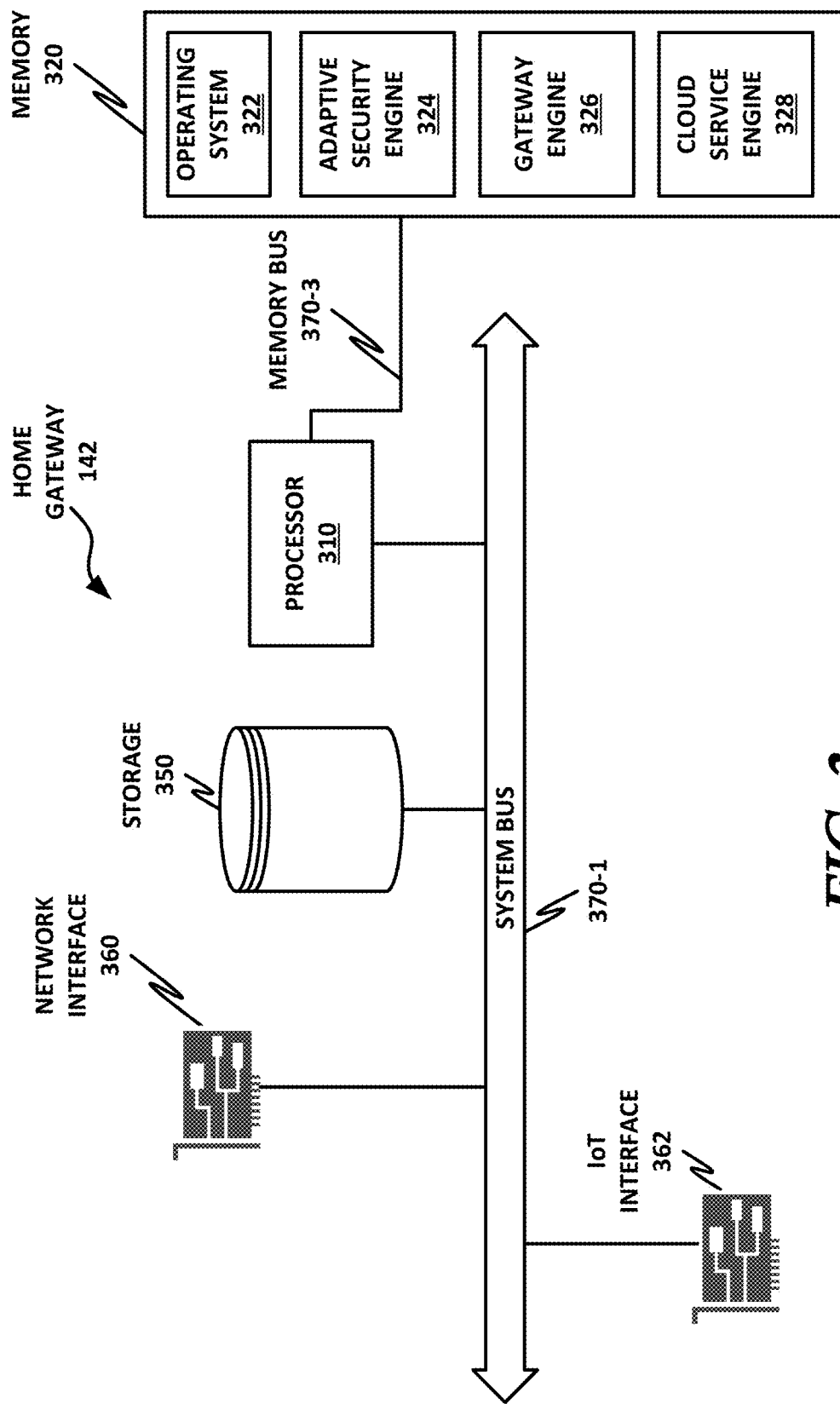
FIG. 3 is a block diagram of a home gateway according to one or more examples of the present specification.

FIG. 3 is a block diagram of a home gateway 142 according to one or more examples of the present specification. Home gateway 142 may be any suitable computing device, as described in connection with FIG. 2. In general, the definitions and examples of FIG. 2 may be considered as equally applicable to FIG. 3, unless specifically stated otherwise. Note that in this example, home gateway 142 includes an adaptive security engine 324, gateway engine 326, and cloud service engine 328. This should be understood to be a nonlimiting example. In some cases, these different engines may be provided on two, three, or more separate devices.

Home gateway 142 includes a processor 310 connected to a memory 320, having stored therein executable instructions for providing an operating system 322 and at least software portions of a adaptive security engine 324. Other components of home gateway 142 include a storage 350, network interface 360, and peripheral interface 340. As described in FIG. 2, each logical block may be provided by one or more similar or dissimilar logic elements.

In an example, processor 310 is communicatively coupled to memory 320 via memory bus 370-3, which may be for example a direct memory access (DMA) bus. Processor 310 may be communicatively coupled to other devices via a system bus 370-1.

Processor 310 may be connected to memory 320 in a DMA configuration via DMA bus 370-3, or via any other suitable memory configuration. As discussed in FIG. 2, memory 320 may include one or more logic elements of any suitable type.

Storage 350 may be any species of memory 320, or may be a separate device, as described in connection with storage 250 of FIG. 2. Storage 350 may be, or may include therein, a database or databases or data stored in other configurations, and may include a stored copy of operational software such as operating system 322 and software portions of adaptive security engine 324.

Network interface 360 may be provided to communicatively couple server 140 to a wired or wireless network, and may include one or more logic elements as described in FIG. 2.

IoT interface 362 may be the same physical interface as network interface 360, or a different physical device. As a gateway, home gateway 142 may need to couple to both enterprise network 170, as well as external network 172. This allows home gateway 142 to provide bridging between the two network. Thus, from a logical perspective, IoT interface 362 is the interface that home gateway 142 uses to connect to IoT edge devices, while network interface 360 may be used to connect to external network 172. In those embodiments in which cloud service engine 328 is on a separate device from adaptive security engine 324 and/or gateway engine 326, home gateway 142 may communicatively couple to the cloud service via external network 172.

Adaptive security engine 324 is an engine as described in FIG. 2 and, in one example, includes one or more logic elements operable to carry out computer-implemented methods as described in this specification. Software portions of adaptive security engine 324 may run as a daemon process.

Adaptive security engine 324 may include one or more non-transitory computer-readable mediums having stored thereon executable instructions operable to instruct a processor to provide a security engine. At an appropriate time, such as upon booting home gateway 142 or upon a command from operating system 322 or security administrator 150, processor 310 may retrieve a copy of adaptive security engine 324 (or software portions thereof) from storage 350 and load it into memory 320. Processor 310 may then iteratively execute the instructions of adaptive security engine 324 to provide the desired method. Operationally, adaptive security engine 324 may be configured to provide methods and services, such as security pipeline 410 and other functions of home gateway 142 disclosed in FIG. 4, as well as method 500 of FIG. 5 and method 600 of FIG. 6 and method 700 of FIG. 7.

Gateway engine 326 may include one or more non-transitory computer-readable mediums having stored thereon executable instructions operable to instruct a processor to provide a security engine. At an appropriate time, such as upon booting home gateway 142 or upon a command from operating system 322 or security administrator 150, processor 310 may retrieve a copy of gateway engine 326 (or software portions thereof) from storage 350 and load it into memory 320. Processor 310 may then iteratively execute the instructions of adaptive security engine 324 to provide the desired method. Operationally, gateway engine 326 may be configured to provide gateway services to edge devices 110, as described in more detail above.

Cloud service engine 328 may include one or more non-transitory computer-readable mediums having stored thereon executable instructions operable to instruct a processor to provide a security engine. At an appropriate time, such as upon booting home gateway 142 or upon a command from operating system 322 or security administrator 150, processor 310 may retrieve a copy of cloud service engine 328 (or software portions thereof) from storage 350 and load it into memory 320. Processor 310 may then iteratively execute the instructions of adaptive security engine 324 to provide the desired method. Operationally, cloud service engine 328 may provide methods such as cloud analytics of FIG. 4 and method 700 of FIG. 7.

Figure 4:
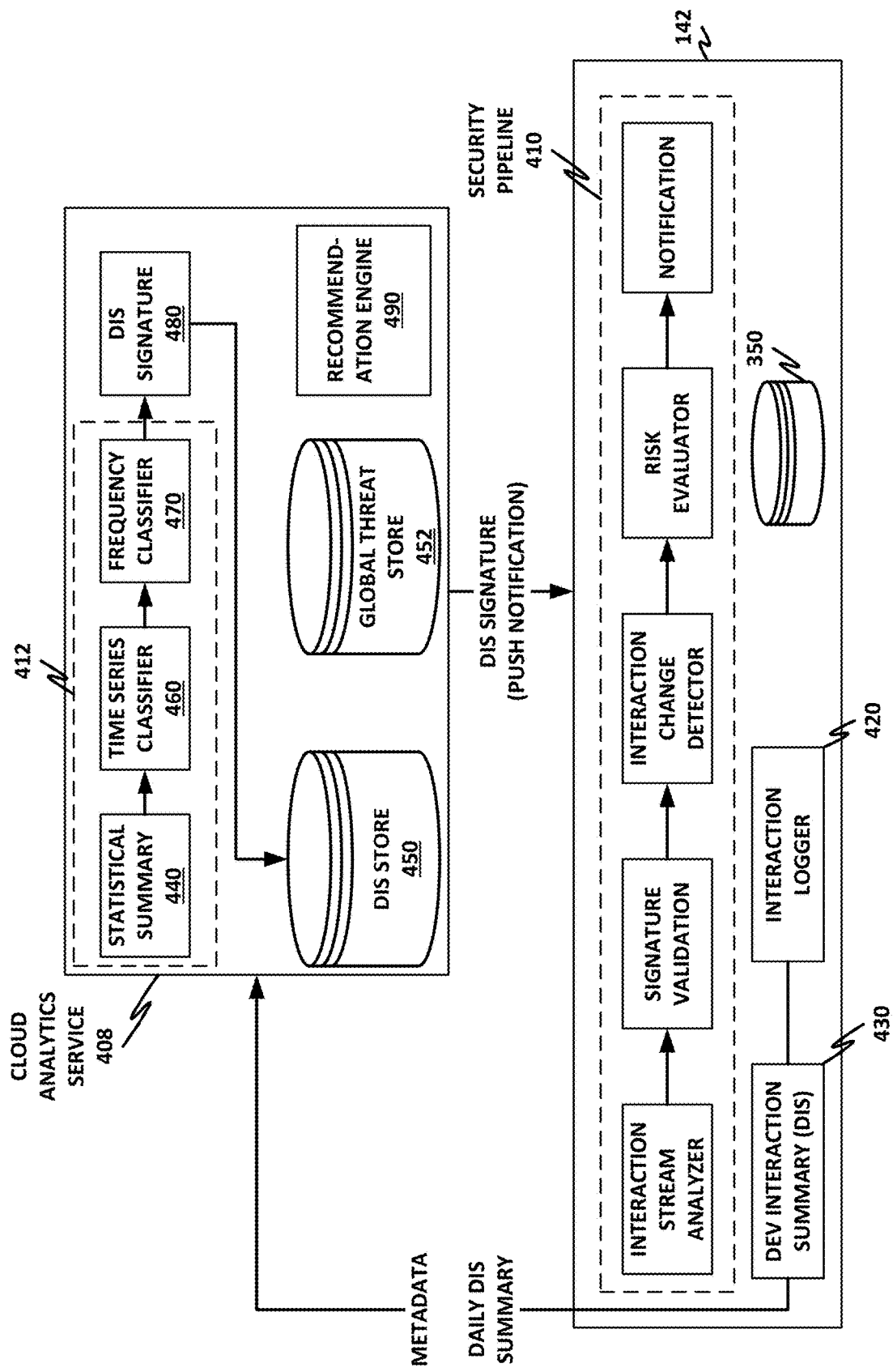
FIG. 4 is a block diagram of an edge security architecture according to one or more examples of the present specification.

FIG. 4 is a block diagram of an adaptive security architecture according to one or more examples of the present specification. In the example of FIG. 4, home gateway 142 and cloud analytics service 408 are disclosed by way of example. Home gateway 142 may be a home gateway as described in more detail above (e.g., in FIG. 3), while cloud analytics service 408 may be a service or device operated by security services provider 190. Note that cloud analytics service 408 may be provided on or within cloud gateway 142, within the same enterprise as cloud gateway 142, by a separate third-party vendor, or in any other embodiment that may be selected for a particular embodiment.

Edge devices 110 are communicatively coupled to home gateway 142, although those connections are not shown in this figure for simplicity of the illustration. When edge devices 110 interact with home gateway 142, interaction logger 420 logs each interaction, such as storing the interaction in storage 350, with a separate log maintained for each device.

At the end of each period, such as the end each day, a device interaction summary (DIS) 430 is built for each device. Home gateway 142 then provides the daily DIS, along with metadata for each device, to cloud analytics service 408. In its turn, cloud analytics service 408 builds a DIS signature 480 for each device. This may include a cloud analytics pipeline 412. DIS signature 480 may be any appropriate class, object, or data structure suitable for storage in DIS store 450, and for transmission to home gateway 142.

In this example, cloud analytics pipeline 412 starts with a statistical summary 440, such as the mean, median, mode, distribution, standard deviations, and any other statistical data that may be deemed useful for a particular embodiment.

Cloud analytics service 408 then builds one or more time series classifiers for the device. This may include the full content of the DIS, and in some embodiment may include a characteristic time-series mathematical model, which may derived based on a time series classification. Nonlimiting examples of classifications include periodic (e.g., notifications are provided approximately n times every period p), continuous (e.g., notifications are provided very frequently, though not necessarily on a fixed period), random (e.g., in a period p, a number of interactions from n to n+k are provided, spaced unevenly and not necessarily predictably), piecewise periodic (e.g., periodic within certain times), piecewise continuous (e.g., continuous within certain times), and piecewise random (e.g., random within certain times), seasonal periodic (e.g., seasonally periodic), seasonal continuous (e.g., seasonally continuous), seasonal random (e.g., seasonally random), seasonal piecewise periodic (e.g., seasonally piecewise periodic), seasonal piecewise continuous (e.g., seasonally piecewise continuous), and seasonal piecewise random (e.g., seasonally piecewise random). Note that in some embodiments, continuous may (but not must) be a special case of periodic—a periodic interaction where p is relatively small. Also note that the term "seasonal," as used herein, may include spring, summer, winter, and fall, but are not limited to those geological seasons. A season may include any phenomenon that recurs on a relatively regular basis.

Example of seasonal edge devices may include a snow blower or a lawnmower. A smart snow blower may not be expected to send notifications during the summer months, while a smart lawnmower would not be expected to send notifications during the winter months. Furthermore, unless they are used in large-scale commercial operations, the lawnmower would not be expected to be turned on more frequently than approximately once a week, while the snow blower would not be expected to be turned on more frequently than once or twice a day, thus introducing a piecewise element to these devices. These seasonal operations could also be coupled with coordinating devices. For example, the snow blower and lawnmower may coordinate with a weather station or an online weather service. In that case, the snow blower would be expected to operate primarily when snow is predicted or observed by the weather station. On the other hand, the lawnmower would not be expected to be used or provide notifications when heavy rain is predicted or observed by the weather station.

Frequency classifier 470 may be a frequency domain classifier derived from time series classifier 460. Frequency classifier 470 may be a mathematical transform, such as a continuous linear transform, of a continuous or piecewise continuous function extrapolated from the discrete time-series data of DIS 430, or may be a discrete transform, such as a discrete linear transform, of the discrete time series data of DIS 430. Frequency classifier 470 may also include a class selected from periodic, continuous, random, piecewise periodic, piecewise continuous, piecewise random, seasonal periodic, seasonal continuous, seasonal random, seasonal piecewise periodic, seasonal piecewise continuous, and seasonal piecewise random, by way of nonlimiting example.

Statistical summary 440, time series classifier 460, and frequency classifier 470 may all be part of DIS signature 480. DIS signature 480 may also include any other information that is deemed useful to a particular embodiment, such as device metadata, hardware signatures, encryption or decryption keys, information about protocols, information about the expected size, format, and content of interactions, unit conversions, or user credentials, by way of nonlimiting example. In some cases, cloud analytics service 408 includes a TEE, and DIS signature 480 is cryptographically signed. Once DIS signature 480 is completely built, cloud analytics service 408 stores DIS signature 480 in a DIS store 450. DIS signature 480 may then be provided, at any suitable time, to any home gateway 142 or other host device. In one embodiment, cloud analytics service 408 provides DIS signature 480 to home gateway 142 via push notification, and home gateway 142 then stores DIS signature 480 in storage 350.

Cloud analytics service 408 may also provide DIS signature 480 to home gateway 142 as a push notification. Home gateway 142 may store DIS fingerprint 480 in storage 350.

In one nonlimiting and illustrative example, a DIS signature 480 may include the following fields:

a. Time-domain and/or frequency-domain class:
 i. Periodic—The edge device sends data periodically. Notifications are provided approximately n times every period p. For example, a WiFi access point may provide a status report every hour, in which case n=1 and p=1 hr. Note that a special case of periodic may include patterns where the number of interactions in a time period is predictable, but not necessarily uniform. For example, an industrial machine could switch on, run for 20 minutes, switch off, wait 5 minutes for the piece being worked to be replaced, switch on, run for 20 minutes, then switch off and cool down for one hour before switching on again. This may still be considered "periodic" because the intervals are predictable, even though they are not uniform.
 ii. Continuous—The edge device sends data continuously. For example, a temperature sensor measuring the current temperature updates its measurement every one minute.
 iii. The edge device sends data only during an event, such as on occurrence of the event. A motion sensor, for example, may be random, because it is triggered only when there is motion, which is not predictable. In an example of an temperature sensor, it may send an update only when the temperature changes by two degrees or more. In a period p, a number of interactions from n to n+k are provided, spaced unevenly and not necessarily predictably.
 iv. Piecewise periodic—The edge device sends interactions periodically, but only at certain times. For example, a washing machine may send an update every time it changes cycles, but only when it is turned on. Note that for piecewise classes, the piecewise nature may itself be part of the pattern, where the piecewise nature is essentially analogous to a random pattern. For example, it may unusual for a home (i.e., non-industrial) washing machine to run several times every day, but the exact times when the washing machine will be switched on may not be reliably predictable.
 v. Piecewise continuous—The edge device sends continuous interactions, but only at certain times. For example, an amateur radio may provide continuous updates such as input power levels, output power levels, and operational frequencies, but only when the device is turned on.
 vi. Piecewise random—The edge device sends random interactions, but only at certain times. For example, a smart appliance such as a blender provides self-test based maintenance requests, but only if the device is turned on.
 vii. Seasonal periodic—The edge device sends periodic interactions, but only during certain "season" (which as described above, may be any periodically recurring event). As piecewise classes are somewhat analogous to random interactions, so are seasonal classes somewhat analogous to periodic interactions. The seasons occur at generally predictable times. A seasonal periodic device may include a water level sensor in an irrigation water reservoir. The sensor may send hourly water level reports during the time of year (such as April to October) that irrigation water is provided to customers.
 viii. Seasonal continuous—The edge device provides continuous interactions seasonally. For example, the water level sensor of the previous example could be configured to provide continuous, real-time water level indications.
 ix. Seasonal random—The edge device provides random interactions seasonally. For example, a ski lift, operable only in winter months, may provide updates when the load exceeds a given threshold.
 x. Seasonal piecewise periodic—As the name implies, this is a combination of seasonal and piecewise. For example, a solar farm may provide hourly updates of power generated as long as the power is over a threshold value, and only during daylight hours. In this case, the "season" is the day-night cycle. The "piecewise" nature arises from events such as clouds or other disturbances that can unpredictably affect solar panel efficiency.

xi. Seasonal piecewise continuous—As the name implies, this is a combination of seasonal and piecewise. For example, the solar array of the previous example may provide continuous updates.

xii. Seasonal piecewise random—As the name implies, this is a combination of seasonal and random. For example, a lawnmower may provide maintenance alerts, or alerts when it is low on oil and gas. These updates occur randomly, and are expected only during the season where the lawnmower is expected to be operated, such as April to October.

b. Periodicity of interaction: In cases where a definable period is included, time series information of the interactions may be used to find the periodicity of interaction. Statistical minimum, maximum, and averages of the periodicity of interactions may also be generated. This may help to ignore noise in the interactions.

c. Temporal patterns of interaction (based on interaction count): Devices interactions that are random do not have any pattern. Continuous data sets with constant periodicity may be characterized by a straight line following the x-axis. For interaction data sets that are continuous but have differing periodicity, the counts can be plotted as time series graph using "symbolic aggregate approximation" (SAX). Thus, in appropriate circumstances, this field may include a mathematical interaction signature.

d. Seasonal variations of interactions: Temporal data may be compared over a long period of time to adjust for seasonal variations of the interaction pattern.

e. Time ranges of interaction: Interaction data may be analyzed to identify time ranges during which the edge device interacts with the gateway (e.g., it is unusual to receive garage door interactions in the middle of the night). A list of expected time ranges may be included in the signature finger print.

f. Related or coordinating devices: Certain coordinating devices may be tagged as "related" (e.g., coordinating weather forecasts with a lawnmower or snow blower). This information may be used to correlate temporal patterns of interaction. This correlation may help to find anomalies related to patterns of related devices interacting with gateway.

A sample JSON structure for embodying a DIS signature 480 is provided below. Note that this example is for illustrative purposes only, and is nonlimiting.

```
{
Classification : random / continuous / periodic
Piecewise: true / false
Seasonal: true / false
Periodicity : { unit : minute / second / hour, value : integer
   Temporal Pattern : aabXcbded
Time ranges : { [6.00 - 7.20], [10.00 - 11.30], [16.00 - 18.00]}
   Seasonal Variation : { signature changes for each season
   } Related To: {None / Device ID}
}
```

Note that in some cases edge devices manufactured specifically to work with the system and method described here may ship with a pre-built DIS signature 480, which can be uploaded to home gateway 142 as part of an initial installation, or cloud analytics service 408 may maintain a global store of baseline DIS signatures 480 for many different devices. In those cases, DIS signature 480 may be updated over time if the use case of a particular installation varies from the baseline DIS signature 480.

Once home gateway 142 is provisioned with DIS signatures 480, it is prepared to provide security services for home network 100. In this case, edge devices 110 interact with home gateway 142. Home gateway 142 may then use a security pipeline 410 to analyze each interaction or series of interactions. Note that the ordering of operations in security pipeline 410 is provided by way of nonlimiting example only. In this example, security pipeline 410 includes an interaction stream analyzer, signature validation, interaction change detector, risk evaluator, and notification.

Security pipeline 410 may include, for example, the following:

a. Interaction stream analyzer: Incoming interactions may be stored as a stream of data, and may use a sliding window method. Edge device interactions may be analyzed for the following:

b. Signature Validation:

i. Pattern: A SAX pattern or other mathematical representation may be used to determine whether the new incoming interactions match DIS signature 480.

ii. Periodicity: Interaction frequency information (minimum, maximum and averages) may be used to determine if the current interaction stream varies from the bounds of DIS signature 480.

c. Interaction change detector: Any substantial variations from DIS signature 480, representing a change in pattern, may be an indicator that the edge device is behaving erroneously or erratically.

d. Risk Score: This may be particularly applicable to devices that control or actuate real-world objects. Risk information may be included in device metadata. Devices with greater potential for physical harm may have, for example, a lower risk tolerance than devices that cannot cause physical harm. On the other hand, devices that perform critical functions may be more resistant to blacklisting or other remediation.

Home gateway 142 may use the pipeline to detect anomalies, and then to take appropriate remedial action. Remedial action could include blacklisting the affected device (drop all incoming traffic until the security administrator has explicitly re-enabled it), temporarily blacklisting the affected device (e.g., ignoring incoming traffic from the affected device until the erroneous pattern ceases), "graylisting" the device (marking the device as suspicious, and requesting further analysis or evaluation), or requesting further instructions. Requesting further instructions could include querying security administrator 150 locally for instructions (which may include presenting a number of available options), or simply notifying security administrator 150 of the condition. Requesting further instructions could also include querying cloud analytics service 408. In that case, cloud analytics service 408 may maintain a large, comprehensive global database of threats and their effects on devices. This may enable cloud analytics service 408 to more accurately identify the source of the error, and advise home gateway 142 of an appropriate remedial action. Thus, in certain embodiments, home gateway 142 can benefit from the heavy processing capabilities provided by and global intelligence gathered by cloud analytics service 408, without having to provide or mirror those capabilities locally.

Depending on the signature, use case, and other variables, security pipeline 410 may measure interactions from edge devices 110 either as individual interactions, or as a series of interactions, such as in a sliding window. For example, if time series classifier 460 indicates that certain devices never or almost never provide interactions at certain times, interaction during that time may be suspicious. To provide just one nonlimiting example, it may be extremely uncommon for the garage door to open between 11 PM and 6 AM. Thus, time series classifier 460 may determine that even a single interaction from the garage door at 3:00 a.m. is suspicious, and at least provide a notification to security administrator 150 (if nothing else, this notification may alert sleeping parents that their kids are sneaking out of the house in the middle of the night to toilet paper a neighbor's house).

In some examples, taking remedial action may include comparing the suspicious interaction to a risk threshold. For example, a single opening of the garage door at an unusual time may not be enough to trigger autonomous remedial action (such as blacklisting), but may be enough to trigger a notification to security administrator 150. However, numerous garage door notifications at an unusual time, or a sudden stream of notifications indicating that the garage door is being continuously opened and closed at an unreasonable rate, may warrant blacklisting. Thus, the risk evaluator of security pipeline 410 may compare mismatches to a particular threshold, and determine whether further remedial action is warranted. Note that in some cases, when unusual interactions are determined to be authorized, or are repeated enough times and validated as legitimate, those formerly unusual interactions may become part of DIS signature 480. For example, if the owner of home gateway 142 begins working a swing shift, then a legitimate number of garage door interactions in the middle of the night may be deemed normal and may be integrated into DIS signature 480.

In contrast to suspicious individual events, some interactions can be labeled suspicious only after a series of interactions. For example, a smart refrigerator 110-5 may be configured to provide a notification of which groceries are needed. In that case, RFID chips can be used to identify products currently in the fridge. When certain products are no longer detected, smart fridge 110-5 may determine that the user is out of those products, and then provide a notification to home gateway 142 that it is time to go grocery shopping. In general usage, smart fridge 110-5 provides such notifications not more than one to three times in a day, when a product is exhausted. Thus, if smart fridge 110-5 suddenly sends 100 notifications in a very short time period, this may be more characteristic of a DoS attack than a legitimate interaction from smart fridge 110-5.

In some embodiments, cloud analytics service 408 may also include a global threat store 452. Global threat store 452 may be a globalized catalog of threats encountered by many different clients, along with characteristics or signatures for how those threats behave. Advantageously, global threat store 442 may include data collected from many different clients, so that an operator of home gateway 142 benefits not only from issues encountered on home network 170, but also on many other home networks. A recommendation engine 490 may then be able to provided recommended remedial actions to home gateway 142.

Figure 5:
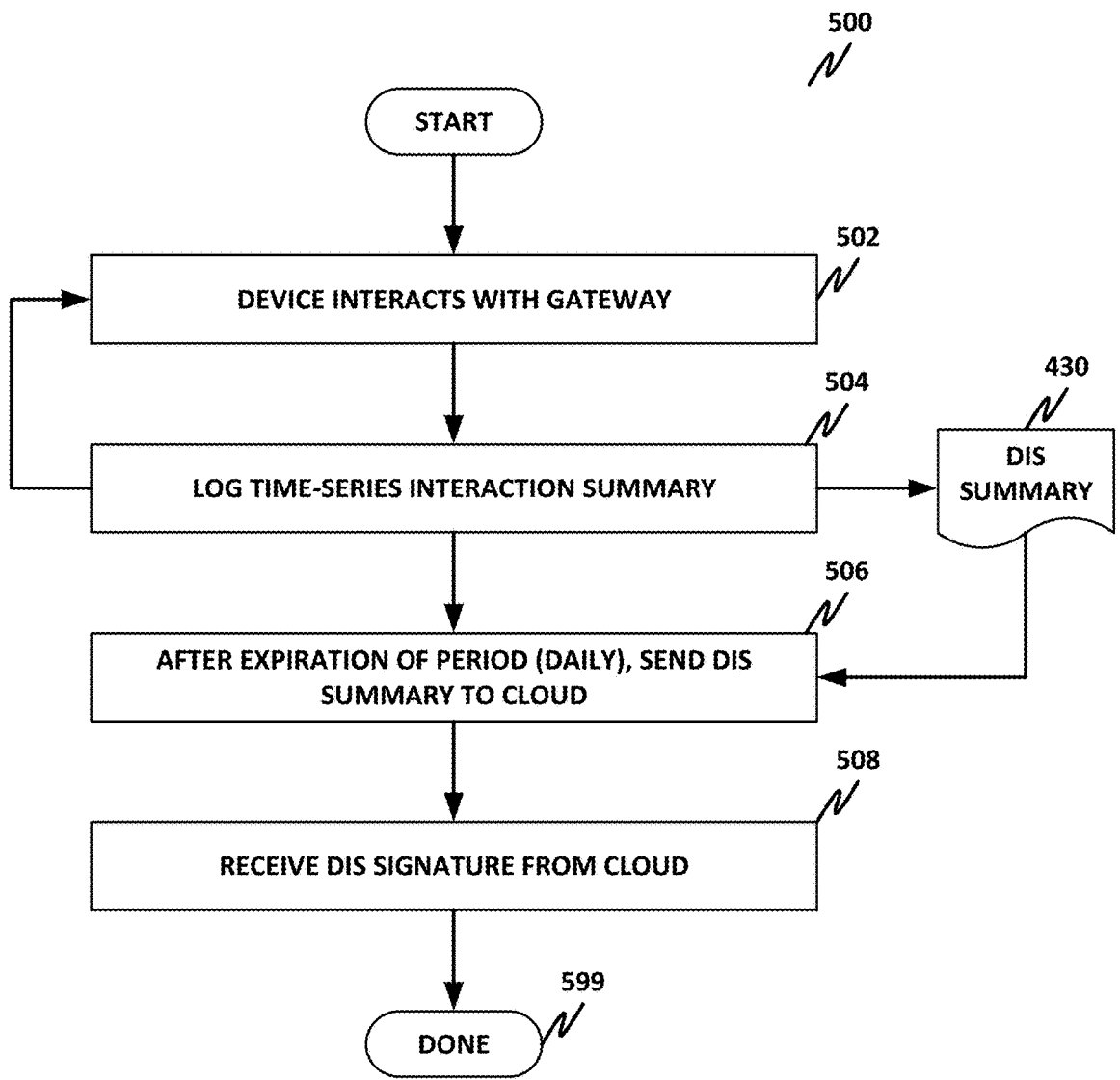
FIG. 5 is a flow chart of a method performed by a home gateway according to one or more examples of the present specification.

FIG. 5 is a flowchart of a method 500 performed by home gateway 142 according to one or more examples of the present specification.

Starting in block 502, an edge device 110 interacts with Gateway 142. This interaction may be, for example, a notification that the device is turned on, turned off, that an event has occurred, a periodic status update, a report of change of conditions, an error report, a maintenance request, a self-test report, an operational report, a substantive data report, or any other suitable notification or interaction that edge device 110 may provide to home gateway 142.

In block 504, interaction logger 420 logs the interaction with edge device 110. Home gateway 142 may either continuously or incrementally update DIS 430, or may decompile a complete DIS at the end of the observation period, such as one day.

In block 506, after the expiration of the period, such as hourly, daily, weekly, monthly, or any other time, home gateway 142 sends DIS 430 to cloud analytics service 408.

Some time thereafter, home gateway 142 receives from cloud analytics service 408 a DIS signature 480. In some examples, this may be provided as a push notification. In appropriate embodiments, DIS signature 480 may be cryptographically signed, such as from within a TEE, which can be verified by a TEE of home gateway 142. This helps to prevent "man in the middle" attacks on the system.

In block 599, the method is done.

Figure 6:
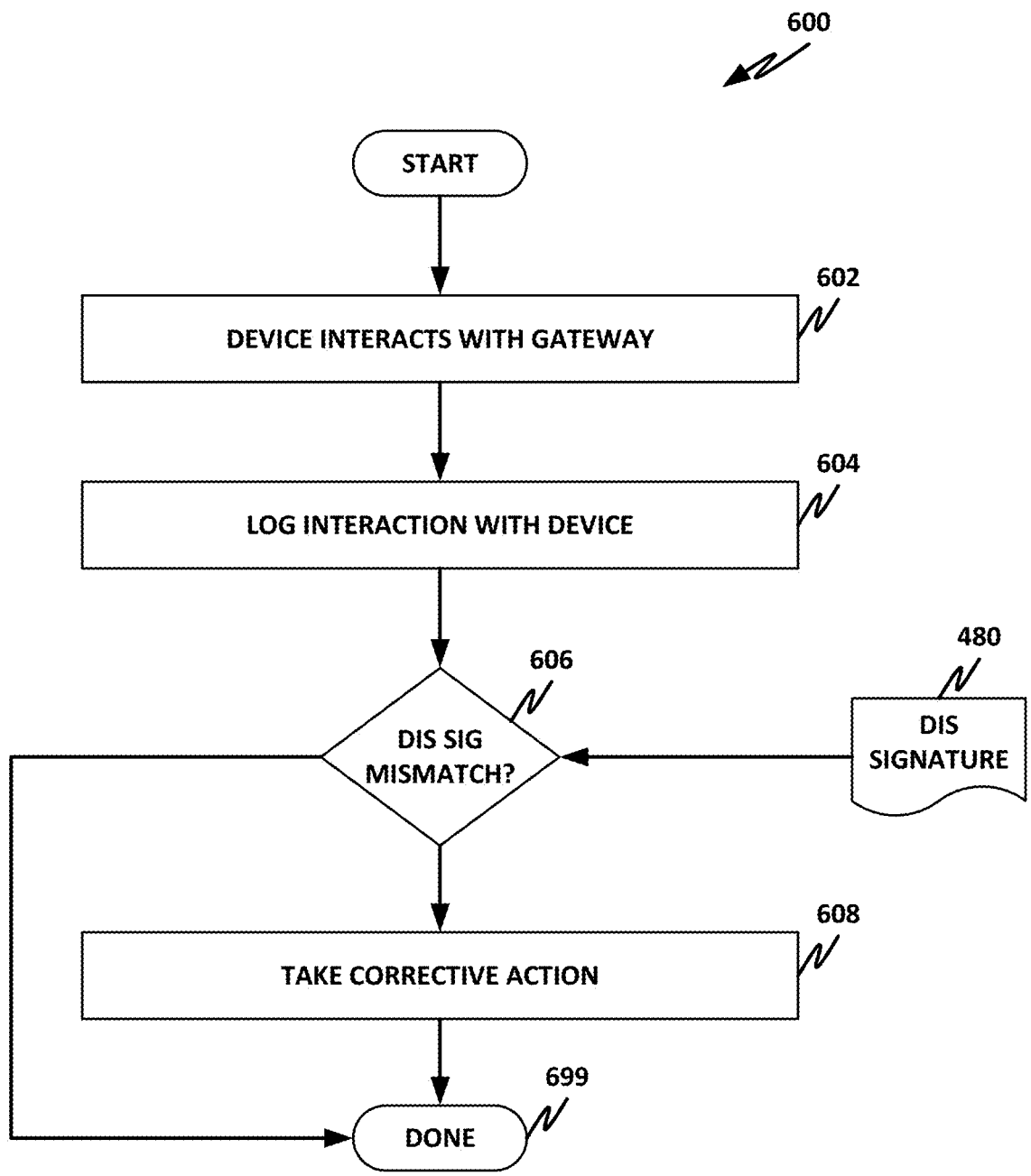
FIG. 6 is a flow chart of a method performed by a home gateway according to one or more examples of the present specification.

FIG. 6 is a flowchart of a method 600 performed by home gateway 142 according to one or more examples of the present specification. Method 600 may occur after home gateway 142 has received a DIS signature 480 for a particular edge device 110.

In block 602, edge device 110 interacts with home gateway 142. This interaction may take the form of any of the previously mentioned interactions.

In block 604, interaction logger 420 logs the interaction with device 110.

In decision block 606, home gateway 142 inspects DIS signature 480 for edge device 110, and determines whether there is a mismatch between the interaction and DIS signature 480. This may be comparing a single interaction to the signature, or it may be comparing a series of interactions to the signature, such as in a sliding window, as appropriate.

If there is a mismatch, then in block 608, the notification engine of security pipeline 410 takes remedial action, such as notifying a security administrator 150, blacklisting edge device 110, temporarily blacklisting edge device 110, graylisting edge device 110, querying cloud analytics service 408 for a recommended action, or taking any other suitable action appropriate to the situation.

Either after taking remedial action in block 608, or because there is no signature mismatch in block 606, in block 699, the method is done.

Figure 7:
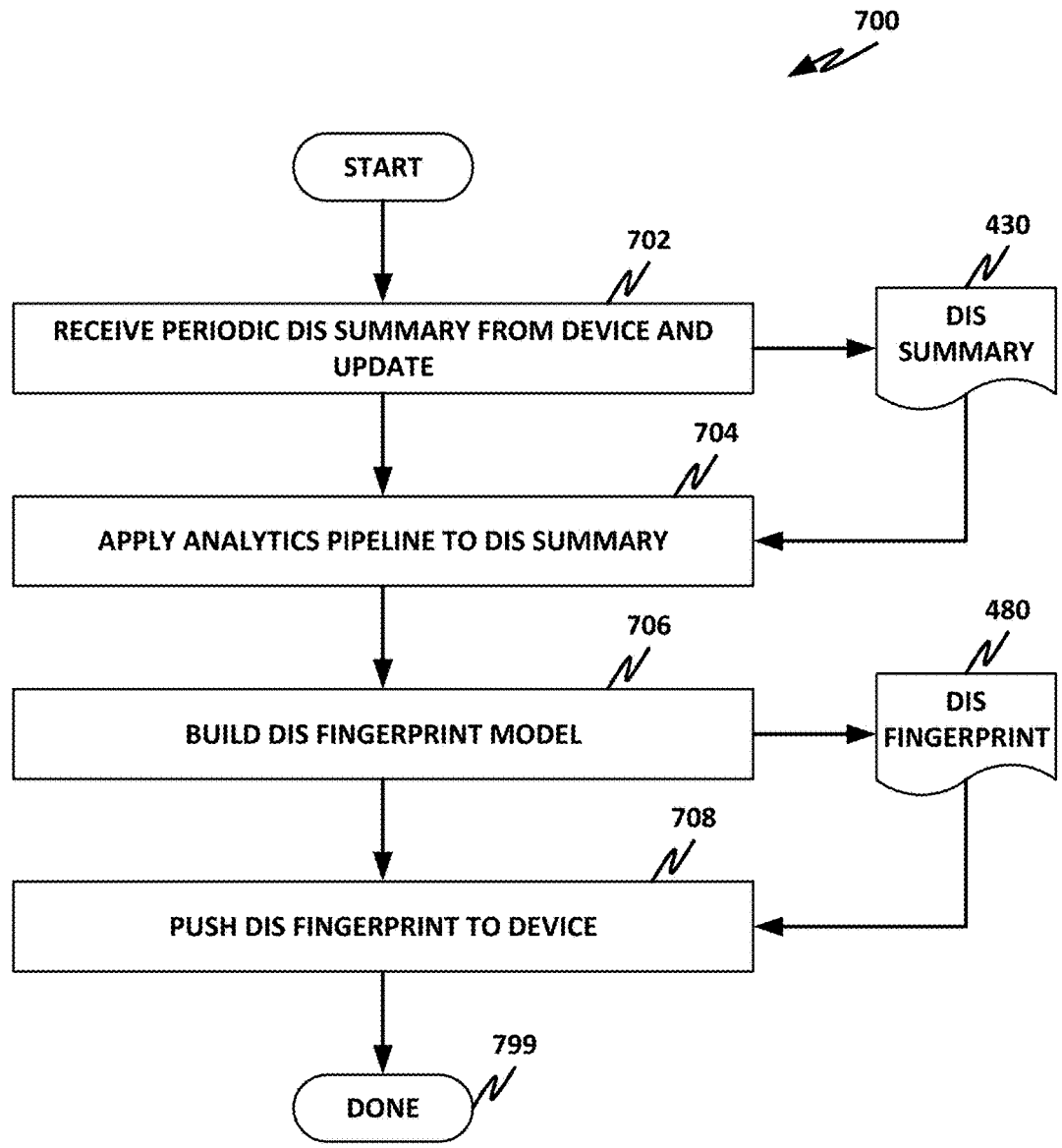
FIG. 7 is a flow chart of a method performed by a cloud service according to one or more examples of the present specification.

FIG. 7 is a flowchart of a method 700 performed by cloud analytics service 408 according to one or more examples of the present specification.

In block 702, cloud analytics service 408 receives from security pipeline 142 a DIS 430. Cloud analytics service 408 may store DIS 430 in DIS store 450.

In block 704, cloud analytics service 408 applies analytics pipeline 412 to DIS summary 430, as described in more detail above. The result of this is a DIS signature 480.

In block 706, cloud analytics service 408 stores DIS signature 480, such as in DIS store 450.

In block 708, cloud analytics service 408 pushes DIS fingerprint 480 to home gateway 142.

In block 799, the method is done.

Figure 8:
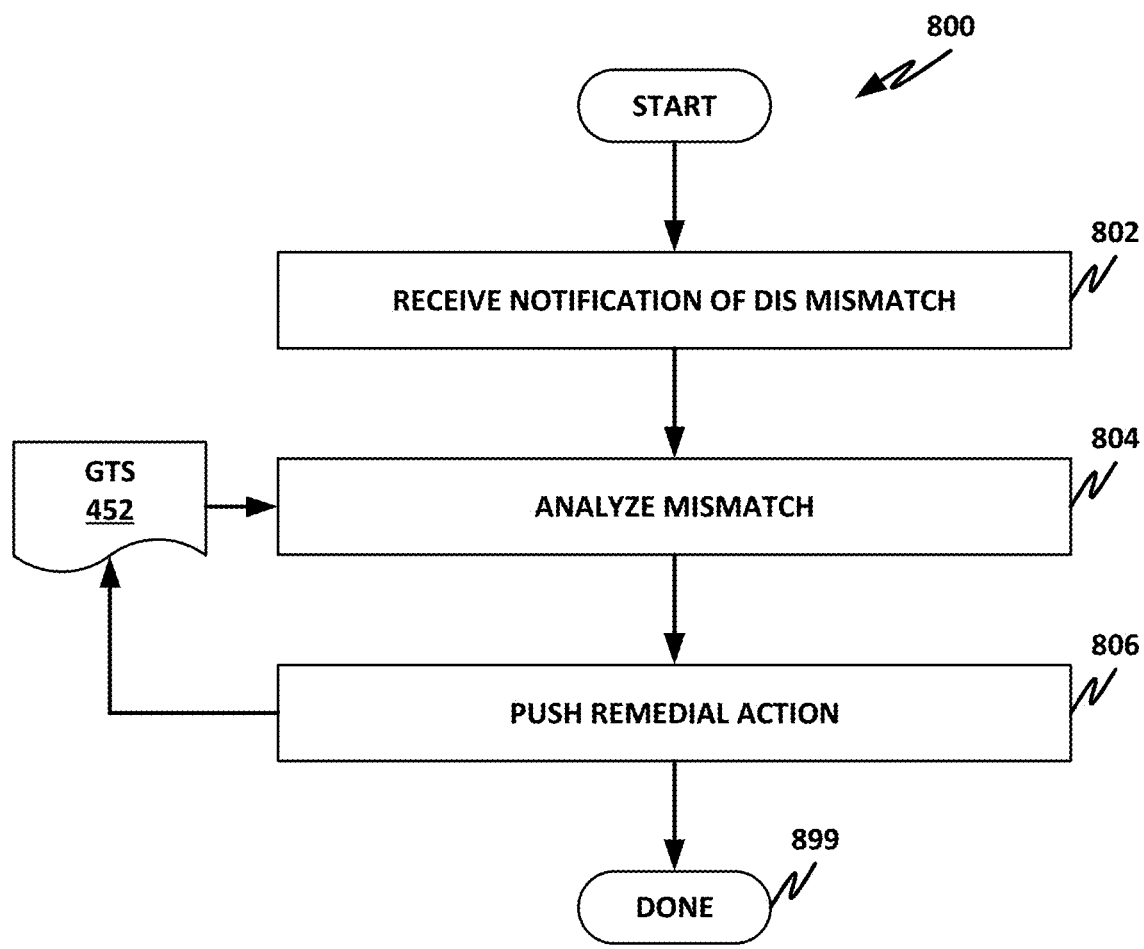
FIG. 8 is a flow chart of a method performed by a cloud service according to one or more examples of the present specification.

FIG. 8 is a flow chart of a method 800 performed by cloud analytics service 408 according to one or more examples of the present specification.

In block 802, cloud analytics service 408 receives a notification that a home gateway 142 has encountered an irregularity (such as a DIS signature mismatch) and has requested a remedial action for the mismatch.

In block 804, using data from global threat store 452, recommendation engine 490 analyzes the conditions of the mismatch and the reported behavior of edge device 110. This is compared to behavioral signatures or other data stored in global threat store 452. Recommendation engine 490 may then craft a best recommended remedial action.

In block 806, cloud analytics service 408 sends the recommended remedial action to home gateway 142, such as via a push notification. The decided remedial action along with any updates to the threat signature may also be loaded back into global threat store 452 to further enrich the data contained therein.

In block 899, the method is done.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

The particular embodiments of the present disclosure may readily include a system on chip (SOC) central processing unit (CPU) package. An SOC represents an integrated circuit (IC) that integrates components of a computer or other electronic system into a single chip. It may contain digital, analog, mixed-signal, and radio frequency functions: all of which may be provided on a single chip substrate. Other embodiments may include a multi-chip-module (MCM), with a plurality of chips located within a single electronic package and configured to interact closely with each other through the electronic package. In various other embodiments, the digital signal processing functionalities may be implemented in one or more silicon cores in Application Specific Integrated Circuits (ASICs), Field Programmable Gate Arrays (FPGAs), and other semiconductor chips.

Additionally, some of the components associated with described microprocessors may be removed, or otherwise consolidated. In a general sense, the arrangements depicted in the figures may be more logical in their representations, whereas a physical architecture may include various permutations, combinations, and/or hybrids of these elements. It is imperative to note that countless possible design configurations can be used to achieve the operational objectives outlined herein. Accordingly, the associated infrastructure has a myriad of substitute arrangements, design choices, device possibilities, hardware configurations, software implementations, equipment options, etc.

Any suitably-configured processor component can execute any type of instructions associated with the data to achieve the operations detailed herein. Any processor disclosed herein could transform an element or an article (for example, data) from one state or thing to another state or thing. In another example, some activities outlined herein may be implemented with fixed logic or programmable logic (for example, software and/or computer instructions executed by a processor) and the elements identified herein could be some type of a programmable processor, programmable digital logic (for example, a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof. In operation, processors may store information in any suitable type of non-transitory storage medium (for example, random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. Further, the information being tracked, sent, received, or stored in a processor could be provided in any database, register, table, cache, queue, control list, or storage structure, based on particular needs and implementations, all of which could be referenced in any suitable timeframe. Any of the memory items discussed herein should be construed as being encompassed within the broad term 'memory.'

Computer program logic implementing all or part of the functionality described herein is embodied in various forms, including, but in no way limited to, a source code form, a computer executable form, and various intermediate forms (for example, forms generated by an assembler, compiler, linker, or locator). In an example, source code includes a series of computer program instructions implemented in various programming languages, such as an object code, an assembly language, or a high-level language such as OpenCL, Fortran, C, C++, JAVA, or HTML for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

In one example embodiment, any number of electrical circuits of the FIGURES may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In another example embodiment, the electrical circuits of the FIGURES may be implemented as stand-alone modules (e.g., a device with associated components and circuitry configured to perform a specific application or function) or implemented as plug-in modules into application specific hardware of electronic devices.

Note that with the numerous examples provided herein, interaction may be described in terms of two, three, four, or more electrical components. However, this has been done for purposes of clarity and example only. It should be appreciated that the system can be consolidated in any suitable manner. Along similar design alternatives, any of the illustrated components, modules, and elements of the FIGURES may be combined in various possible configurations, all of which are clearly within the broad scope of this specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 (pre-AIA) or paragraph (f) of the same section (poast-AIA), as it exists on the date of the filing hereof unless the words "means for" or "steps for" are specifically used in the particular claims; and (b) does not intend, by any statement in the specification, to limit this disclosure in any way that is not otherwise reflected in the appended claims.

Example Implementations

There is disclosed in one example, an apparatus, comprising: a network interface to communicatively couple to an internet of thing (IoT) comprising at least one edge device; a gateway engine to provide gateway services to one or more edge devices via the network interface; and one or more logic devices, including at least one hardware logic device, comprising an adaptive security engine to: compile a periodic device interaction summary (DIS) for the edge device; send the DIS to a cloud service; receive from the cloud service a DIS signature for the edge device; determine that one or more interactions from the edge device are suspicious; and act on the determining.

There is further disclosed an example, wherein the device signature comprises a data provision class.

There is further disclosed an example, wherein the data provision class is selected from the group consisting of periodic, continuous, random, piecewise periodic, piecewise continuous, and piecewise random, seasonal periodic, seasonal continuous, and seasonal random.

There is further disclosed an example, wherein determining that one or more interactions from the edge device are suspicious comprises determining that there is a change of data provision class.

There is further disclosed an example, wherein determining that one or more interactions from the edge device are suspicious comprises determining that the one or more interactions deviate substantially from the DIS signature.

There is further disclosed an example, wherein determining that the one or more interactions deviate substantially from the DIS signature comprises determining that the one or more interactions include a statistical mismatch with the DIS signature.

There is further disclosed an example, wherein acting on the determining comprises blacklisting the edge device.

There is further disclosed an example, wherein acting on the determining comprising temporarily blacklisting the edge device.

There is further disclosed an example, wherein acting on the determining comprises providing an alert to a security administrator.

There is further disclosed an example, wherein acting on the determining comprises requesting an action from a security administrator.

There is further disclosed an example, wherein the DIS signature includes a temporal interaction profile.

There is further disclosed in an example, one or more tangible, non-transitory computer-readable storage mediums having stored thereon executable instructions for providing an adaptive security engine to: communicatively couple to an internet of thing (IoT) comprising at least one edge device; provide gateway services to one or more edge devices via the network interface; compile a periodic device interaction summary (DIS) for the edge device; send the DIS to a cloud service; receive from the cloud service a DIS signature for the edge device; determine that one or more interactions from the edge device are suspicious; and act on the determining.

There is further disclosed an example, wherein the device signature comprises a data provision class.

There is further disclosed an example, wherein the data provision class is selected from the group consisting of periodic, continuous, random, piecewise periodic, piecewise continuous, and piecewise random, seasonal periodic, seasonal continuous, and seasonal random.

There is further disclosed an example, wherein determining that one or more interactions from the edge device are suspicious comprises determining that there is a change of data provision class.

There is further disclosed an example, wherein determining that one or more interactions from the edge device are suspicious comprises determining that the one or more interactions deviate substantially from the DIS signature.

There is further disclosed an example, wherein determining that the one or more interactions deviate substantially from the DIS signature comprises determining that the one or more interactions include a statistical mismatch with the DIS signature.

There is further disclosed an example, wherein acting on the determining comprises blacklisting the edge device.

There is further disclosed an example, wherein acting on the determining comprising temporarily blacklisting the edge device.

There is further disclosed an example, wherein acting on the determining comprises providing an alert to a security administrator.

There is further disclosed an example, wherein acting on the determining comprises requesting an action from a security administrator.

There is further disclosed an example, wherein the DIS signature includes a temporal interaction profile.

A method of providing an adaptive security engine, comprising: communicatively coupling to an internet of thing (IoT) comprising at least one edge device; providing gateway services to one or more edge devices via the network interface; compiling a periodic device interaction summary (DIS) for the edge device; sending the DIS to a cloud service; receiving from the cloud service a DIS signature for the edge device; determining that one or more interactions from the edge device are suspicious; and acting on the determining.

There is further disclosed an example, wherein the device signature comprises a data provision class.

There is further disclosed an example, wherein the data provision class is selected from the group consisting of periodic, continuous, random, piecewise periodic, piecewise continuous, and piecewise random, seasonal periodic, seasonal continuous, and seasonal random.

There is further disclosed an example, wherein determining that one or more interactions from the edge device are suspicious comprises determining that there is a change of data provision class.

There is further disclosed an example, wherein determining that one or more interactions from the edge device are suspicious comprises determining that the one or more interactions deviate substantially from the DIS signature.

There is further disclosed an example, wherein determining that the one or more interactions deviate substantially from the DIS signature comprises determining that the one or more interactions include a statistical mismatch with the DIS signature.

There is further disclosed an example, wherein acting on the determining comprises blacklisting the edge device.

There is further disclosed an example, wherein acting on the determining comprising temporarily blacklisting the edge device.

There is further disclosed an example, wherein acting on the determining comprises providing an alert to a security administrator.

There is further disclosed an example, wherein acting on the determining comprises requesting an action from a security administrator.

There is further disclosed an example, an apparatus comprising means for performing the method of any of the preceding examples.

There is further disclosed an example, wherein the means for performing the method comprise a processor and a memory.

There is further disclosed an example, wherein the memory comprises machine-readable instructions, that when executed cause the apparatus to perform the method of any preceding example.

There is further disclosed an example, wherein the apparatus is a computing system.

There is further disclosed in an example, at least one computer readable medium comprising instructions that, when executed, implement a method or realize an apparatus as claimed in any preceding example.

There is further disclosed in an example, a method of providing cloud analytics for a home gateway, comprising: receiving a periodic device interaction summary (DIS) for an edge device managed by the home gateway; compiling a statistical summary of the DIS; compiling a time series classifier of the DIS; converting the time series classifier to a frequency series classifier; and building a DIS signature at least in part from the frequency series classifier.

There is further disclosed an example, further comprising writing the DIS signature to a DIS signature store.

There is further disclosed an example, further comprising providing a push notification of the DIS signature to the home gateway.

There is further disclosed an example, further comprising receiving a notification that the home gateway has encountered a suspicious interaction pattern.

There is further disclosed an example, further comprising providing to the home gateway a recommended action responsive to the suspicious interaction pattern.

There is further disclosed an example, wherein providing the recommended action comprises sending a push notification.

There is further disclosed in an example, an apparatus comprising means for performing the method of any preceding example.

There is further disclosed an example, wherein the means for performing the method comprise a processor and a memory.

There is further disclosed an example, wherein the memory comprises machine-readable instructions, that when executed cause the apparatus to perform the method of any preceding example.

There is further disclosed an example, wherein the apparatus is a computing system.

There is further disclosed in an example, at least one computer readable medium comprising instructions that, when executed, implement a method or realize an apparatus as claimed in any preceding example.

What is claimed is:

1. An apparatus, comprising:
a gateway device comprising:
  a processor;
  a network interface to communicatively couple to an internet of things (IoT) system comprising a set of edge devices;
  a gateway engine executable by the processor to provide gateway services to the set of edge devices via the network interface, wherein data is received from the set of edge devices in association with the respective operation of each of the set of edge devices; and
  an adaptive security engine executable by the processor to:
    compile, for a time period, device interaction summary (DIS) data for a particular one of the set of edge devices, wherein the DIS data identifies a type of the particular edge device and describes activity of the particular edge device within the time period;
    send the DIS data to a cloud service;
    receive from the cloud service a DIS signature generated for the edge device by the cloud service based on the DIS data, wherein the DIS signature comprises a defined structure comprising a plurality of fields, each of the plurality of fields contains information for a respective one of a plurality of classes of expected behavior of the particular edge device;
    detect, from the data received from the particular edge device during operation of the particular edge device, one or more behavioral characteristics of the particular edge device;
    compare the behavioral characteristics with information in the DIS signature to determine that the behavioral characteristics of the edge device are suspicious; and
    initiate a remedial action at the gateway device based on determining that the behavioral characteristics of the edge device are suspicious.

2. The apparatus of claim 1, wherein the plurality of classes of expected behavior comprise a frequency-domain class, a periodicity class, a pattern of interaction class, a seasonal variation class, a time range of interaction class, and a related devices class.

3. The apparatus of claim 2, wherein the expected behavior associated with the frequency-domain class comprises one of periodic, continuous, random, piecewise periodic, piecewise continuous, piecewise random, seasonal periodic, seasonal continuous, or seasonal random.

4. The apparatus of claim 1, wherein one or more of the classes of expected behavior are determined using a machine learning algorithm applied to the DIS data.

5. The apparatus of claim 1, wherein determining that the behavioral characteristics of the edge device are suspicious comprises determining that one or more of the behavioral characteristics deviate from one or more of the classes of expected behavior defined in the DIS signature.

6. The apparatus of claim 5, wherein deviation from one or more of the classes of expected behavior comprises a statistical mismatch between the behavioral characteristic and the one or more of the classes of expected behavior of the DIS signature.

7. The apparatus of claim 1, wherein the remedial action comprises blacklisting the edge device.

8. The apparatus of claim 1, wherein the remedial action comprises temporarily blacklisting the edge device.

9. The apparatus of claim 1, wherein the remedial action comprises providing an alert to a security administrator.

10. The apparatus of claim 1, wherein the remedial action comprises requesting an action from a security administrator.

11. The apparatus of claim 1, wherein the DIS signature is cryptographically protected.

12. At least one non-transitory machine accessible storage medium having code stored thereon, the code when executed on a machine, causes the machine to:
   communicatively couple to an internet of things (IoT) system comprising connections to a set of edge devices;
   provide gateway services to the set of edge devices via the network interface;
   compile, for a time period, device interaction summary (DIS) data for a particular one of the set of edge devices, wherein the DIS data identifies a type of the particular edge device and describes activity of the particular edge device within the time period;
   send the DIS data to a cloud service;
   receive from the cloud service a DIS signature generated for the edge device by the cloud service based on the DIS data, wherein the DIS signature comprises a defined structure comprising a plurality of fields, each of the plurality of fields contains information for a respective one of a plurality of classes of expected behavior of the particular edge device;
   detect, from the data received from the particular edge device during operation of the particular edge device, one or more behavioral characteristics of the particular edge device;
   compare the behavioral characteristics with information in the DIS signature to determine that the behavioral characteristics of the edge device are suspicious; and
   initiate a remedial action at the gateway device based on determining that the behavioral characteristics of the edge device are suspicious.

13. The storage medium of claim 12, wherein the plurality of classes of expected behavior comprise a frequency-domain class, a periodicity class, a pattern of interaction class, a seasonal variation class, a time range of interaction class, and a related devices class.

14. The storage medium of claim 13, wherein the expected behavior associated with the frequency-domain class comprises one of periodic, continuous, random, piecewise periodic, piecewise continuous, piecewise random, seasonal periodic, seasonal continuous, or seasonal random.

15. The storage medium of claim 12, wherein the connections to the set of edge devices comprise one or more non-Internet Protocol (IP) connections.

16. The storage medium of claim 15, wherein the one or more non-IP connections comprise one or more of a wireless Universal Serial Bus (USB), Bluetooth, Z-wave, ZigBee, body area network (BAN), or Bluetooth Low Energy (BILE) connection.

17. The storage medium of claim of claim 16, wherein the set of edge devices comprise IoT devices.

18. The storage medium of claim 12, wherein the remedial action comprises blacklisting the edge device.

19. The storage medium of claim 12, wherein the remedial action comprises temporarily blacklisting the edge device.

20. The storage medium of claim 12, wherein the remedial action comprises providing an alert to a security administrator.

21. The storage medium of claim 12, wherein the remedial action comprises requesting an action from a security administrator.

22. The storage medium of claim 12, wherein the DIS signature includes a temporal interaction profile.

23. A method of providing an adaptive security engine, comprising:
   communicatively coupling to an internet of things (IoT) system comprising connections to a set of edge devices;
   providing gateway services to the set of edge devices via the network interface;
   compiling, for a time period, device interaction summary (DIS) data for a particular one of the set of edge devices, wherein the DIS data identifies a type of the particular edge device and describes activity of the particular edge device within the time period;
   sending the DIS data to a cloud service;
   receiving from the cloud service a DIS signature generated for the edge device by the cloud service based on the DIS data, wherein the DIS signature comprises a defined structure comprising a plurality of fields, each of the plurality of fields contains information for a respective one of a plurality of classes of expected behavior of the particular edge device;
   detecting, from the data received from the particular edge device during operation of the particular edge device, one or more behavioral characteristics of the particular edge device;
   comparing the behavioral characteristics with information in the DIS signature to determine that the behavioral characteristics of the edge device are suspicious; and
   initiating a remedial action at the gateway device based on determining that the behavioral characteristics of the edge device are suspicious.

24. The method of claim 23, wherein the plurality of classes of expected behavior comprise a frequency-domain class, a periodicity class, a pattern of interaction class, a seasonal variation class, a time range of interaction class, and a related devices class.

25. The method of claim 24, wherein the expected behavior associated with the frequency-domain class comprises one of periodic, continuous, random, piecewise periodic, piecewise continuous, piecewise random, seasonal periodic, seasonal continuous, or seasonal random.

* * * * *